J. HANSON.
PROCESS FOR TREATING STANDING GRAIN.
APPLICATION FILED JULY 30, 1917.
1,297,684.
Patented Mar. 18, 1919.
2 SHEETS—SHEET 2.
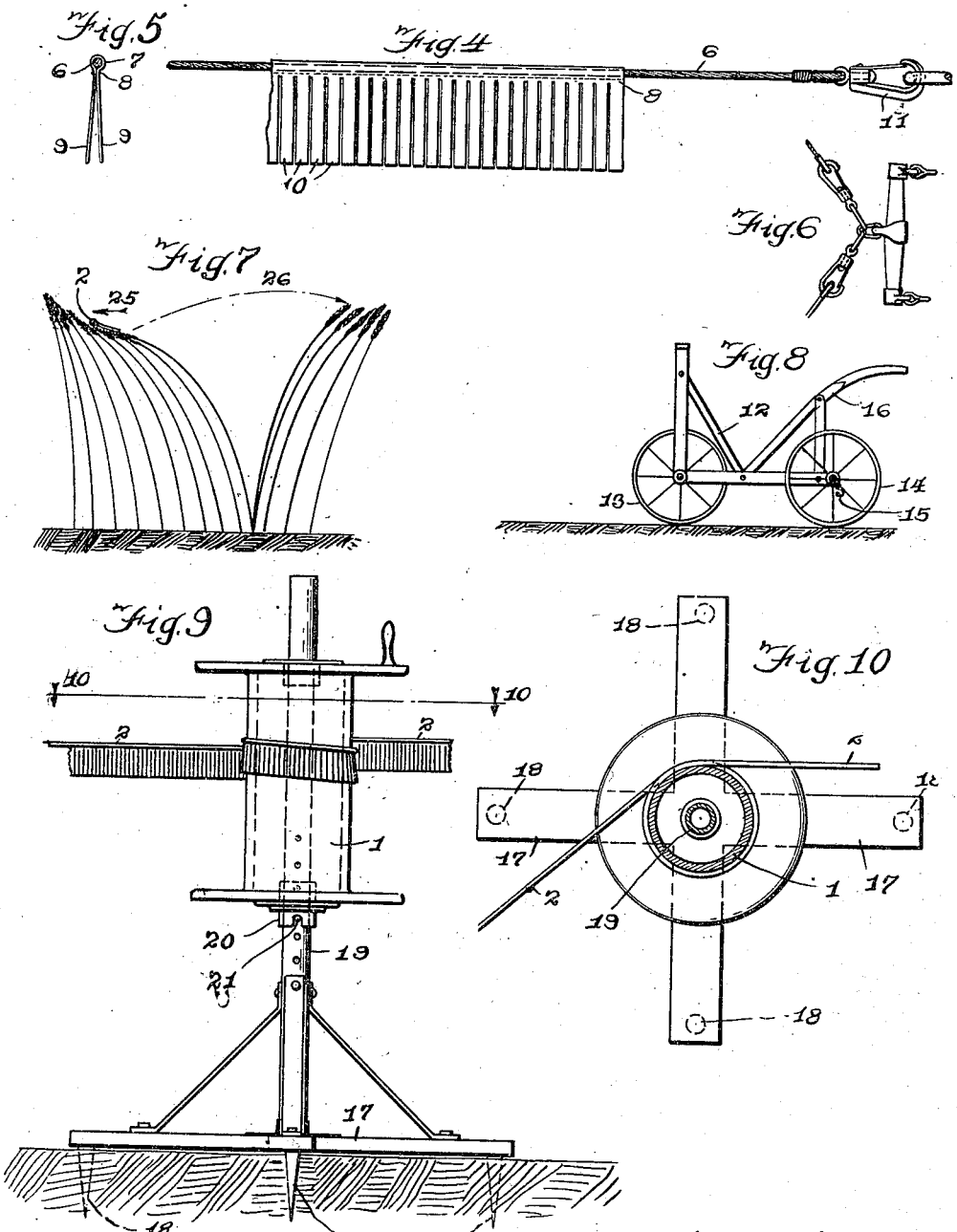
Witness:
L. B. Graham
Inventor:
Johannes Hanson
By Brown, Risser & Sprinkle
Attys.

UNITED STATES PATENT OFFICE.

JOHANNES HANSON, OF MONTEVIDEO, MINNESOTA.

PROCESS FOR TREATING STANDING GRAIN.

1,297,684. Specification of Letters Patent. Patented Mar. 18, 1919.

Application filed July 30, 1917. Serial No. 183,410.

*To all whom it may concern:*

Be it known that I, JOHANNES HANSON, a citizen of the United States, residing at Montevideo, in the county of Chippewa and State of Minnesota, have invented a certain new and useful Process for Treating Standing Grain, of which the following is a specification.

This invention relates to the treatment of standing grain for the purpose of preventing injury thereto by rust, frost, and other injurious causes, and has for its object the increasing of the amount and the betterment of the quality of grain produced.

The invention is exemplified in the steps of the process and in the combination and arrangement of parts shown in the accompanying drawings and described in the following specification, and it is more particularly pointed out in the appended claims.

In the drawings—

Fig. 4 is a side elevation; and Fig. 5 is a cross-sectional view of a part of the apparatus employed in carrying out the invention.

Fig. 6 is a detail showing one method of attaching a draft-animal to the part of the apparatus shown in Fig. 4.

Fig. 7 illustrates in detail the method of applying the invention to standing grain.

Fig. 8 shows a runner or traveling support which may be used in connection with the modification of the invention shown in Fig. 2.

Fig. 9 is an elevational view of a drum used in connection with the invention when applied in the manner shown in Fig. 1; and Fig. 10 is a horizontal sectional view on line 10—10 of Fig. 9.

It is well known to persons familiar with the production of small grain, such as wheat, oats, barley, rye, hemp, corn, etc., that every year the crop is injured both in quantity and quality by the ravages of the disease known as rust, and also, especially in the north, by the effects of early frost. There are a number of varieties of rust which affect grain, among which is the black rust, which is principally confined to the heads of the grain, and the red or stem rust which affects a large part of the stalk or straw. The development of rust on the grain varies from year to year, depending largely upon weather conditions. If there happens to be a period of wet weather, accompanied by high temperature at the time that the kernels are forming in the heads of the grain, the crop is liable to be very seriously affected. The development of the rust depends very largely upon the moisture which adheres to the head and the stalk of the grain during hot weather. The rain fall itself is not particularly conducive of rust development since the force of the falling rain prevents the water from adhering to a great extent to the stalks of grain, and tends to wash the stalks clean of the spores of rust. For the same reason rust is not so prevalent in windy weather. The greatest cause of rust development is the formation of dew upon the stalks of grain, which occurs principally in still weather, and if any dew remains upon the grain on a warm morning until it drys naturally, the proper conditions are produced for the best development of the rust disease, and if this takes place for two or three days in succession, when the grain is in the most susceptible stage, the crop is almost sure to be seriously damaged; if not destroyed, in many instances. My invention contemplates the removal of this moisture from the grain, together with the developing spores of the rust disease before the rust has time to develop sufficiently to produce injury. In order for such treatment to be effective, it is apparent that it must be carried out quickly, and for this reason I have devised a means by which a large tract of grain may be treated in a very short time.

Figure 1:
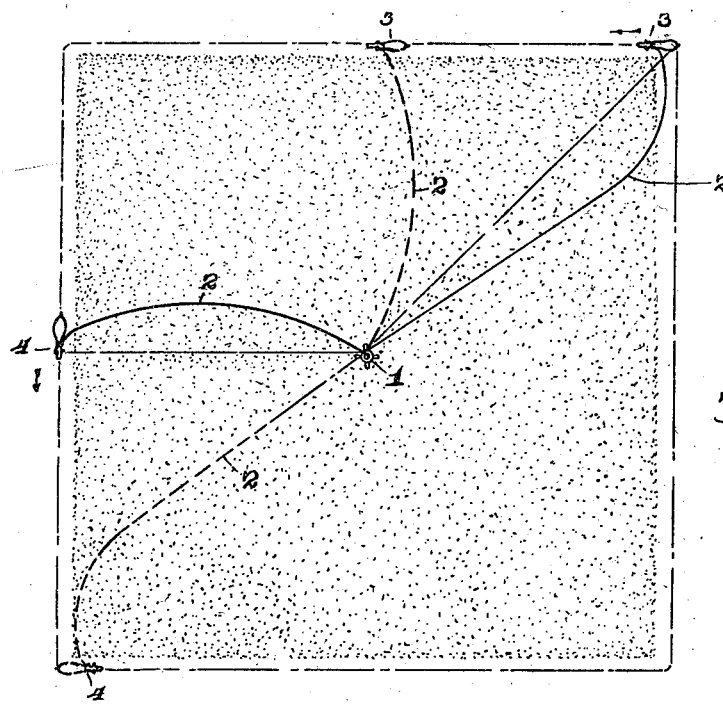
Figure 1 is a plan view of a field of grain being subjected to treatment according to the present invention.
Figure 2:
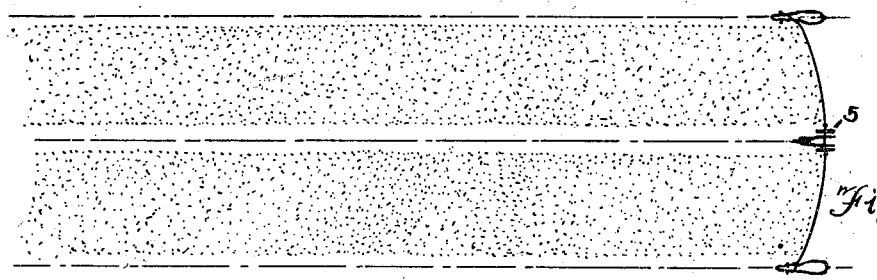
Fig. 2 is a similar view of a field of grain of somewhat different shape and illustrates a somewhat different manner of carrying out the invention.
Figure 3:
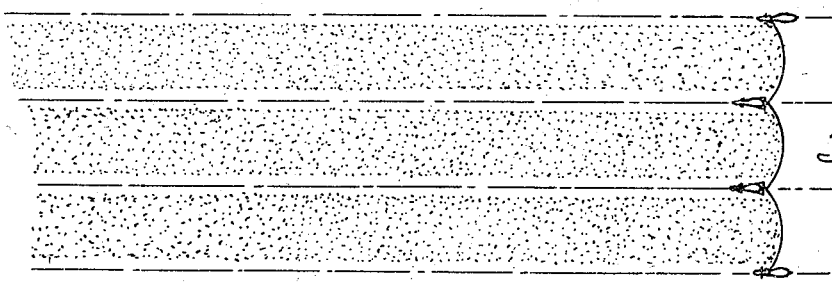
Fig. 3 is a view similar to Fig. 2, but illustrates a still further modification of the method.

In Fig. 1 I have represented diagrammatically a field of standing grain, which may be of any size, it being possible to treat easily a quarter section in the manner shown in this figure. In carrying out the process, a rotary drum, such as is shown at 1 in Fig. 9 of the drawings, is located in the center of the field, and a flexible cable 2 is given a single turn about the drum, as shown also in Fig. 9. One end of the cable is carried to the boundary of the tract at one corner thereof and secured to a draft-animal shown at 3 in Fig. 1. The other end of the cable is carried to the middle of one side of the tract and secured to a second draft-animal 4. The cable is preferably given a slight amount of slack as shown in the drawings. The animals are now driven along the boundary line of the tract in the direction of the arrows, and as they move forward it is apparent that the cable 2 will move about the drum 1 to compensate for the change in the distances between the animals and the drum. While the animal 4 is moving farther away from the drum, the animal 3 will be drawing nearer so that the total amount of cable required will be constant, although the amounts on opposite sides of the drum will vary. At the starting point, shown in full lines in Fig. 1, the amount of cable drawn by the animal 3 will be at its maximum, while the amount drawn by the animal 4 will be at a minimum, but when the animals reach the position shown in broken lines in the figure, the condition will be reversed, and the animal 4 will be drawing a maximum amount of cable. If the field of grain is a comparatively long narrow one, it may be more economical to hitch a pair of animals to opposite ends of a cable of sufficient length to reach across the entire width of the field, as shown in Fig. 2. In this way the entire field is covered by the passage of the animals once along the border. If found desirable the cable may be supported intermediate its length by a traveling support 5, one form of device suitable for this purpose being shown in Fig. 8 of the drawings. If the field is too wide for a single length of cable, a plurality of lengths may be used, as shown in Fig. 3, in which case one or more of the animals must travel through the standing grain. It may be found desirable where a treatment of this kind is contemplated to leave a narrow strip unseeded for this purpose.

A great variety of forms of cable may be used for the purpose of my invention, such as smooth or twisted wire, rope, chains, etc. A good form of cable for the purpose is shown in Fig. 4 of the drawings, in which the cable proper is designated by the numeral 6, and may be a twisted strand of wire such as is sometimes used for clothesline wire, or it may be a plain strand, or a rope, or other form of cable. A light rod may also be employed for this purpose. A piece of canvas 7 is doubled about the cable and stitched, as shown at 8 in the drawings, to hold it in place. The depending flaps 9 are slit into strips 10 which form a fringe or wipers for clearing the grain of moisture the length of the fringe being varied to suit conditions. It is, of course, understood that such a fringe may be formed in a great variety of ways, the one mentioned being shown by way of illustration. The end of the strand is preferably attached to the draft-animal by a swivel hook 11 which may be snapped to the hame or belly-band, or may be secured to the whiffletree. The position of the attachment will depend somewhat upon the manner of carrying out the process and upon the height of the grain. If the animal is drawing the end of a single cable it is preferable to attach the cable to the side of the harness, such as to the hame, while if the animal is drawing the ends of two cables, as shown in Fig. 3, it is better to secure both cables to a whiffletree in the manner illustrated in Fig. 6. I prefer to use a swivel hook for this purpose to overcome twisting of the cable.

The runner or support for the middle portions of the cable may be of a variety of forms, one of which is shown in Fig. 8. In this figure a frame 12 is provided with a front wheel 13, and a pair of rear wheels 14. The cable may be secured to any suitable portion of the runner, but I prefer to secure it to the ends of the axles of the wheels 14 by means of swivel hooks 15. Handles 16 may be provided by which the runner can be guided across the field. In some cases the frame-work may be dispensed with and a single wheel, or a pair of wheels spaced apart on the same axle may be used with the wire secured to the end of the axle by swivel hooks like that shown at 15 in the figure.

The drum 1 for supporting the middle portion of the cable used on square fields may be of a very simple construction, one form being illustrated in Fig. 9. In this form a laterally extending base 17 is provided with stakes 18, which are driven into the ground to hold the drum in place, and an upright standard 19, which may be a plain piece of iron pipe, forms the spindle on which the drum 1 is mounted. The drum is supported by a collar 20 adjustably held in place on the standard 19 by a pin 21.

Fig. 7 illustrates diagrammatically the effect of the cable as it is drawn across a field of standing grain. In this figure the cable 2 is moving in the direction of the arrow 25, and the stalks of grain are bent in the direction in which the cable moves. The cable is supported or floated upon the bending stalks, and as it passes over them it wipes away the clinging dew. As the cable passes off the stalks of grain in succession, each stalk as it is freed from the cable springs backwardly in the direction of the arrow 26 of the drawing, and thus any moisture which is not removed by the cable itself is thrown from the stalk by its springing return movement. In this way the moisture necessary for the development of the rust spores is removed, and not only is the grain freed from the moisture itself, but the moisture carries with it the greater portion of the rust spores, and thus the ravages of the disease is prevented. Usually the passage of the cable across the field in a single direction is sufficient, but if it is found after such a treatment there is still moisture clinging to the grain, the cable may be drawn back across the field in a reverse direction, and thus assurance may be made doubly sure.

The effects of an early frost upon standing grain may be prevented by similar treatment. It is a well known fact that during the formation of the frost the plant itself is not injured, since at this time the water which is being transformed into ice gives off latent heat to the plant itself, and so the moisture in the plant is not frozen and no injury is done unless the frost is permitted to remain upon the plant for some time. When a heavy frost occurs if the field is treated in the manner described above, the clinging frost is removed from the plants in the same way as that described in connection with the dew, and thus the plant is saved from the injurious effect of the continuous contact of its fibers with an icy covering. In this way an entire crop may be saved by the few minutes labor necessary for the application of my process to the field of grain.

Having thus described my invention what I claim as new and desire to secure by Letters Patent of the United States is:

1. The process of treating standing grain which consists of removing moisture from the grain by agitating the stalks in a grain field, said agitation being produced along an extended line made to move progressively over said field transversely of said line, so as to cover rapidly the field to be treated before the moisture on the stalks has had time to cause serious damage.

2. The process of treating standing grain which consists of artificially removing moisture from the grain at times when conditions are suitable for the development of plant rust.

3. The process of treating standing grain which consists of drawing a strand over the field in which the grain is growing so that the stalks are bent by the moving strand and subsequently released to spring backwardly.

4. The process of treating standing grain which consists of removing injurious substances adhering thereto by drawing a strand across the field of grain in contact with the stalks so as to bend the stalks laterally and permit them to spring back when released, thus partially wiping the injurious material from the stalks and partially shaking the material therefrom by the springing action of the grain.

5. The process of treating standing grain which consists of traversing the grain field at times when conditions are suitable for development of plant rust and contacting the grain stalks to remove moisture therefrom.

6. The process of treating standing grain which consists of removing dew from the growing stalks of grain, at a time when conditions are suitable for the development of plant rust on said grain, by traversing the grain field, successively bending the stalks earthward and releasing them permitting sudden return of the grain stalks.

In testimony whereof I have signed my name to this specification, on this 27th day of July, A. D. 1917.

JOHANNES HANSON.